United States Patent
Obrzut et al.

(10) Patent No.: US 9,480,196 B2
(45) Date of Patent: Nov. 1, 2016

(54) VERTICAL TINE TILLER

(71) Applicant: MTD PRODUCTS INC, Valley City, OH (US)

(72) Inventors: Timothy M. Obrzut, Valley City, OH (US); Paul A. Crawford, Valley City, OH (US); Edward Colbrun, Valley City, OH (US); Gregory T. McGinnis, Valley City, OH (US)

(73) Assignee: MTD PRODUCTS INC, Valley City, OH (US)

( * ) Notice: Subject to any disclaimer, the term of this patent is extended or adjusted under 35 U.S.C. 154(b) by 0 days.

(21) Appl. No.: 14/402,263

(22) PCT Filed: May 23, 2013

(86) PCT No.: PCT/US2013/042438
§ 371 (c)(1),
(2) Date: Nov. 19, 2014

(87) PCT Pub. No.: WO2013/177406
PCT Pub. Date: Nov. 28, 2013

(65) Prior Publication Data
US 2015/0144363 A1   May 28, 2015

Related U.S. Application Data

(60) Provisional application No. 61/650,733, filed on May 23, 2012.

(51) Int. Cl.
*A01B 33/06* (2006.01)
*A01B 33/10* (2006.01)
*A01B 33/08* (2006.01)

(52) U.S. Cl.
CPC .............. *A01B 33/06* (2013.01); *A01B 33/065* (2013.01); *A01B 33/085* (2013.01); *A01B 33/106* (2013.01)

(58) Field of Classification Search
CPC  A01B 17/0008;  A01B 21/06;  A01B 33/146; A01B 49/025;  A01B 33/06;  A01B 33/065; A01B 33/085;  A01B 33/106
See application file for complete search history.

(56) References Cited

U.S. PATENT DOCUMENTS 1,506,042 A * 8/1924 Bauer ................... A01B 33/06
                                                           172/43
1,592,825 A    7/1926 Gardner et al.
(Continued)

FOREIGN PATENT DOCUMENTS

CA      2 874 485      11/2013
CN      1378421        11/2002
(Continued)

OTHER PUBLICATIONS

Communication pursuant to Rules 70(2) and 70a(2) EPC for Application No. 13794416 dated May 27, 2015.
(Continued)

*Primary Examiner* — Matthew D Troutman
(74) *Attorney, Agent, or Firm* — Wegman, Hessler & Vanderburg

(57) ABSTRACT

A vertical tine tiller that includes a chassis, an engine attached to the chassis, a handle assembly extending from the chassis to allow an operator to control the tiller, and at least two vertically oriented tine assemblies. Each of the tine assemblies include a plurality of tines attached to a plate, wherein the tine assemblies are rotatable about a vertical axis such that the tines of each tine assembly provide a grinding path and adjacent tine assemblies have at least partially overlapping grinding paths. The tines are removably connected to the plate.

11 Claims, 6 Drawing Sheets

(56) References Cited

U.S. PATENT DOCUMENTS

| | | | | |
|---|---|---|---|---|
| 1,697,677 | A * | 1/1929 | Davidson | A01B 17/008 172/125 |
| 1,773,672 | A * | 8/1930 | Grim | A01B 33/06 172/111 |
| 2,034,779 | A * | 3/1936 | Storey | A01B 33/085 172/103 |
| 2,034,780 | A * | 3/1936 | Storey | A01B 33/085 172/49.5 |
| 2,050,120 | A * | 8/1936 | Pizarro | A01B 33/065 172/490 |
| 2,410,273 | A * | 10/1946 | Deubner | A01B 33/06 172/111 |
| 2,545,173 | A | 3/1951 | Franklin | |
| 2,582,364 | A | 1/1952 | Tice | |
| 2,625,867 | A | 1/1953 | Hands | |
| RE25,237 | E * | 9/1962 | Heeren | A01B 33/06 111/144 |
| 3,129,772 | A | 4/1964 | Anderson | |
| 3,146,832 | A | 9/1964 | Fry | |
| 3,367,425 | A * | 2/1968 | Heeren | A01B 33/065 172/59 |
| 3,667,551 | A * | 6/1972 | van der Lely | A01B 49/025 172/111 |
| 3,939,918 | A | 2/1976 | Van der Lely | |
| 3,945,441 | A | 3/1976 | Van der Lely et al. | |
| 4,003,436 | A | 1/1977 | Foster et al. | |
| D243,275 | S * | 2/1977 | van der Lely | 172/713 |
| 4,072,196 | A | 2/1978 | Van der Lely | |
| 4,133,389 | A | 1/1979 | Ruhl et al. | |
| 4,293,041 | A | 10/1981 | Holmstadt et al. | |
| 4,301,871 | A * | 11/1981 | van der Lely | A01B 33/106 172/49.5 |
| 4,323,125 | A * | 4/1982 | Pronovost | A01B 39/085 172/125 |
| D265,826 | S | 8/1982 | Holmstadt et al. | |
| 4,363,362 | A * | 12/1982 | Barato | A01B 33/065 172/117 |
| 4,552,223 | A * | 11/1985 | van der Lely | A01B 33/065 172/49.5 |
| 4,726,427 | A | 2/1988 | Steiner | |
| 4,736,802 | A | 4/1988 | Domin | |
| 6,189,627 | B1 | 2/2001 | Marshall et al. | |
| 6,340,061 | B2 | 1/2002 | Marshall et al. | |
| 6,564,878 | B2 * | 5/2003 | Williams | A01B 33/06 172/49.5 |
| 6,763,895 | B1 | 7/2004 | Wilkinson | |
| D582,734 | S | 12/2008 | Murray et al. | |
| 2002/0182010 | A1 * | 12/2002 | Williams | A01B 33/06 405/128.5 |
| 2011/0079404 | A1 | 4/2011 | Pett | |
| 2015/0144363 | A1 | 5/2015 | Obrzut et al. | |

FOREIGN PATENT DOCUMENTS

| | | |
|---|---|---|
| CN | 104602508 | 5/2015 |
| DE | 588 916 | 11/1933 |
| DE | 588916 | 11/1933 |
| DE | 891 633 | 10/1953 |
| DE | 1 136 864 | 9/1962 |
| DE | 1136864 | 9/1962 |
| DE | 2635827 | 2/1977 |
| EP | 2 852 272 | 6/2015 |
| FR | 2 193 532 | 2/1974 |
| FR | 2 321 234 | 3/1977 |
| GB | 369423 | 3/1932 |
| GB | 1 520 135 | 8/1978 |
| WO | 01/17329 | 3/2001 |
| WO | 2013177406 | 11/2013 |

OTHER PUBLICATIONS

GB 1 520 135 published Aug. 2, 1978 which corresponds to and shall serve as English translation of FR 2 321 234.
GB 369 423 dated Mar. 24, 1932 which corresponds to and shall serve as English translation of DE 588 916.
International Search Report and Written Opinion dated Oct. 10, 2013 for corresponding International Patent Application No. PCT/US2013/042438.
Canadian Office Action for corresponding Canadian patent application No. 2,874,485 dated Dec. 18, 2015.
First Office Action for corresponding Chinese Application No. 201380030422.7 dated Jan. 29, 2016.
International Search Report for corresponding International Patent Application No. PCT/US2015/063198 dated Mar. 10, 2016.

* cited by examiner

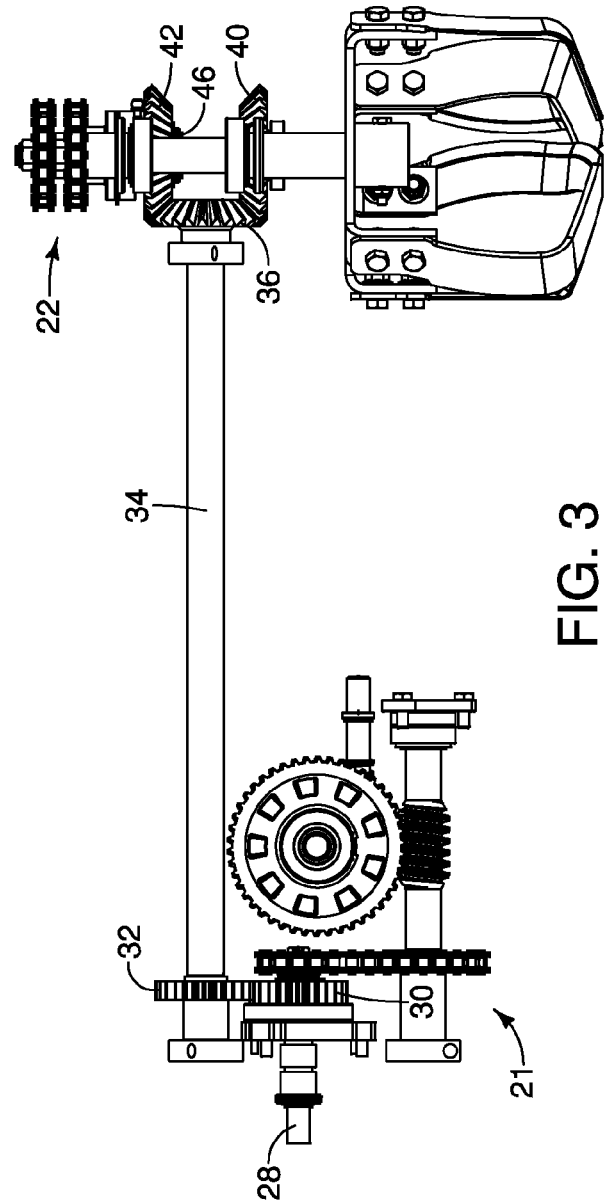
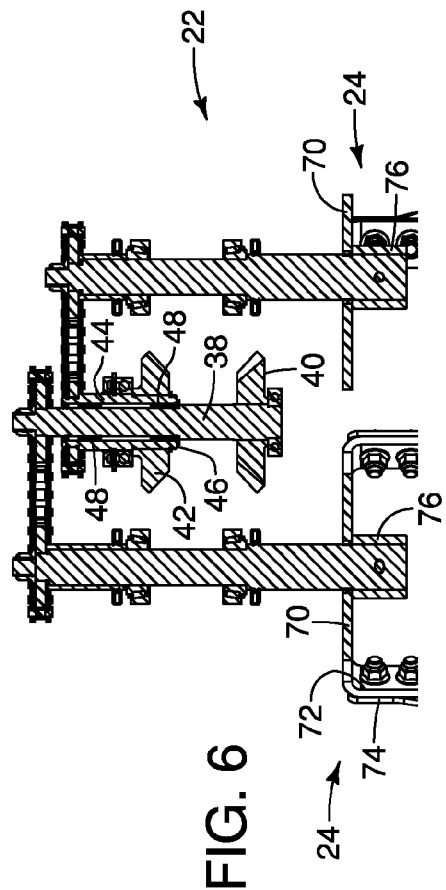
FIG. 3
FIG. 6

VERTICAL TINE TILLER

FIELD OF THE INVENTION

The present invention is directed to yard machinery, and more particularly, to a ground tiller.

BACKGROUND OF THE INVENTION

Yard tillers for tilling or grinding up sections of turf and dirt in a yard are commonly known. Typical tillers include an engine or other power supply mounted on a frame having a pair of laterally-aligned tires having a substantially horizontal axle extending therebetween. The horizontal axle is operatively connected to a chassis, and an engine for powering the tines of the tiller is attached to the chassis. Handles for controlling the tiller extend rearwardly from the chassis, typically rearward of the engine. Conventional tillers have a transmission transfer case extending downwardly from the engine toward the ground, and the transfer case includes either two laterally-extending drive shafts that are oriented substantially parallel to the ground with a tine assembly attached to each drive shaft or a single drive shaft extending from the transfer case in which two or more tine assemblies are attached to the single drive shaft. The transfer case receives rotational power from the engine and provides output rotational power to the horizontal drive shaft(s), thereby changing the longitudinal axis of rotational power from the engine by 90°. Each tine assembly typically includes two to five tines or augers attached and extending from a body, wherein the body is attached directly to a drive shaft such that rotation of the drive shaft causes the body and tines to rotate.

Typical tine assemblies are configured such that the tines rotate about the horizontally-aligned drive shaft(s) in such a manner that the tines are continually rotating away from the operator of the tiller. Such rotational movement of the tines results in the tines rotating forwardly, contacting the ground or dirt, digging into the hardened ground or loose dirt and pulling it rearwardly as the tine rotates rearwardly, then releases the loosened dirt as the tine begins the rotation forwardly over the top of the drive shaft again. This forward rotation of the tines about a horizontal axis tends to pull the tiller forward such that as the tines contact hardened soil that has not yet been loosened by the tines, the tines strike the hardened ground and cause the entire tiller to jolt or jerk. Because the operator is typically using the tiller to ground up and loosen an entire patch of ground, this continuous jerking and jolting action of the tiller requires the operator to maintain an extremely firm grasp on the handles to ensure that the tiller does not lurch forward excessively or tip sideways if the operator loses grip of the handles. Accordingly, the use of conventional tillers requires substantial and continuous physical exertion by an operator to maintain the tiller in an upright position to effectively loosen the soil, which results in the operator's arms becoming tired rather quickly as well as the residual effects of the continuous jolting of the tiller as the tines contact hardened soil.

Therefore, there exists a need for a tiller that reduces or eliminates the continuous jerking and jolting action resulting from the tines or augers contacting compacted or hardened soil during use. There also exists a need for a tiller that lessens the required physical strength and exertion for a user to maintain the tiller in an operative position over an extended period of use of the tiller.

BRIEF SUMMARY OF THE INVENTION

According to one aspect of the present invention, a vertical tine tiller is provided. The vertical tine tiller includes a power supply for generating rotational power. A transfer assembly is operatively coupled to the power supply, the transfer assembly includes a drive shaft for transferring the rotational power, the drive shaft being rotatable about a horizontal axis. The vertical tine tiller also includes a power head, the power head including at least two power rods, wherein each of the power rods is operatively connected to a transfer gear that is operatively connected to the drive shaft for transferring the rotational power. Each of the power rods is rotatable about a separate vertical axis. A tine assembly operatively connected to each of the power rods, the tine assembly including a plurality of vertically aligned tines being rotatable about the vertical axis of the corresponding power rod.

According to another aspect of the present invention, a vertical tine tiller is provided. The vertical tine tiller includes a power supply for providing rotational power. The vertical tine tiller also includes a pair of tine assemblies operatively connected to the power supply for receiving the rotational power. The tine assemblies are rotatable about separate substantially vertical axes, wherein each of the tine assemblies includes a plurality of vertically aligned tines removably attachable to a plate.

According to yet another aspect of the present invention, a vertical tine tiller is provided. The vertical tine tiller includes a power supply for generating rotational power. A transfer assembly is engaged with the power supply. The transfer assembly includes a drive shaft rotatable about a horizontal axis for transferring the rotational power from the power supply. A power head is engaged with the drive shaft of the transfer assembly. The power head includes at least two power rods rotatable about separate vertical axes for transferring the rotational power from the transfer assembly at an angle thereto. A tine assembly is engaged with each of the power rods, each of the tine assemblies is rotatable about the corresponding vertical axis. Each of the tine assemblies includes a plurality of removable tines, the tines of each tine assembly forms a grinding path and adjacent grinding paths at least partially overlap each other.

Advantages of the present invention will become more apparent to those skilled in the art from the following description of the embodiments of the invention which have been shown and described by way of illustration. As will be realized, the invention is capable of other and different embodiments, and its details are capable of modification in various respects.

BRIEF DESCRIPTION OF SEVERAL VIEWS OF THE DRAWINGS

These and other features of the present invention, and their advantages, are illustrated specifically in embodiments of the invention now to be described, by way of example, with reference to the accompanying diagrammatic drawings, in which:

FIG. 3 is a side view of a transmission assembly for a vertical tine tiller;

FIG. 6 is a front cross-sectional view of the transmission assembly shown in FIG. 3.

Figure 1:
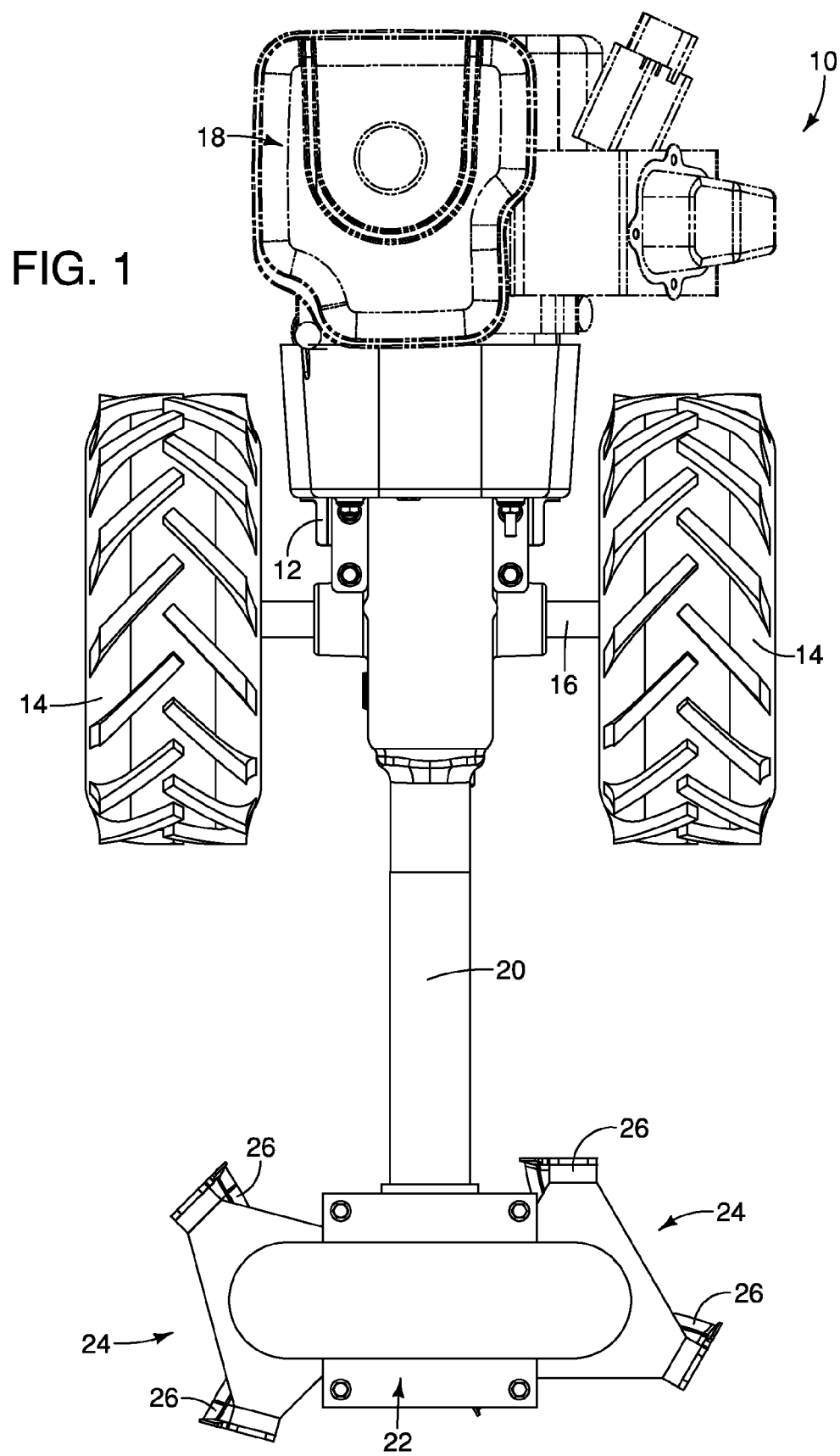
FIG. 1 is a top view of an exemplary embodiment of a vertical tine tiller.

It should be noted that all the drawings are diagrammatic and not drawn to scale. Relative dimensions and proportions of parts of these figures have been shown exaggerated or reduced in size for the sake of clarity and convenience in the drawings. The same reference numbers are generally used to refer to corresponding or similar features in the different embodiments. Accordingly, the drawing(s) and description are to be regarded as illustrative in nature and not as restrictive.

DETAILED DESCRIPTION OF THE PREFERRED EMBODIMENT

Figure 2:
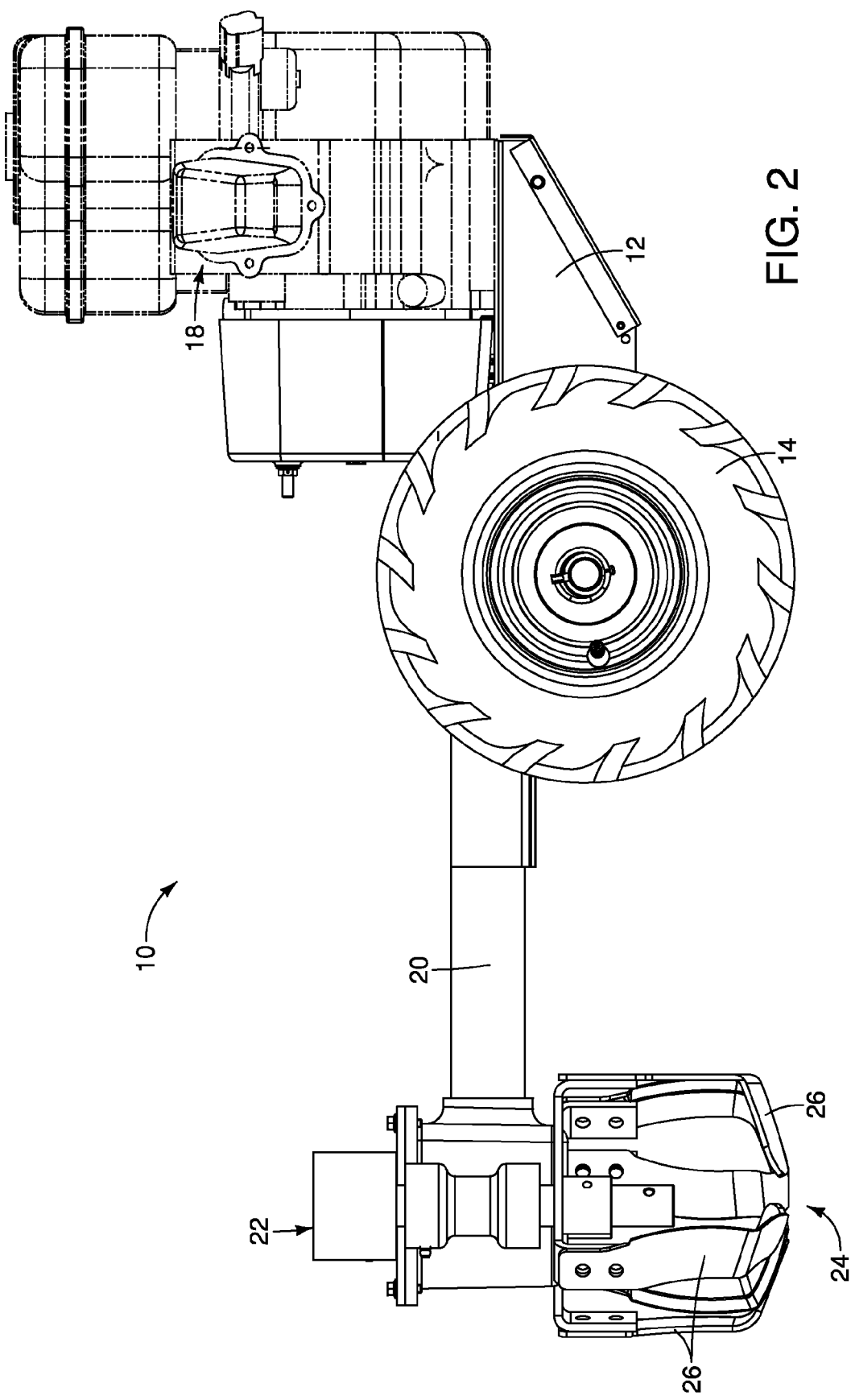
FIG. 2 is a side view of the vertical tine tiller shown in FIG. 1.

Referring to FIGS. 1-2, an exemplary embodiment of a vertical tine tiller 10 is shown. The tiller 10 includes a chassis 12 to which a pair of operator graspable handles (not shown) are attached. The handles allow an operator to control the movement and direction of the tiller 10 during operation. A pair of opposing wheels 14 connected together by an axle 16 are operatively connected to the chassis 12. The wheels 14 allow the tiller 10 to traverse the ground and allow a counter-force to be applied to the chassis 12 to offset the tilling of the ground. A power supply 18 is attached to the chassis 12 to provide rotational power for the tiller 10. In the illustrated embodiment, the power supply 18 is an internal combustion engine. However, it should be understood by one of ordinary skill in the art that the power supply 18 can also include a generator, an electric motor powered by the generator or by A/C power, or any combination thereof An elongated tube 20 extends forwardly from the power supply 18 in a substantially horizontal manner or a manner substantially parallel to the ground, as shown in FIGS. 1-2. The tube 20 is a hollow member that extends between the power supply 18 and the power head 22 of the tiller 10. The tube 20 surrounds a portion of a power transfer assembly 21, as will be described below, that transfers rotational power from the power supply 18 to the power head 22. The power head 22 is configured to receive rotational power from the power supply 18 and transfer such rotational power to a plurality of tine assemblies 24. Each tine assembly 24 includes a plurality of tines 26 that are configured to rotate about a substantially vertical axis to break up compacted or hardened soil as well as further break down clumps of soil and plant matter into smaller clumps and particles.

Figure 4:
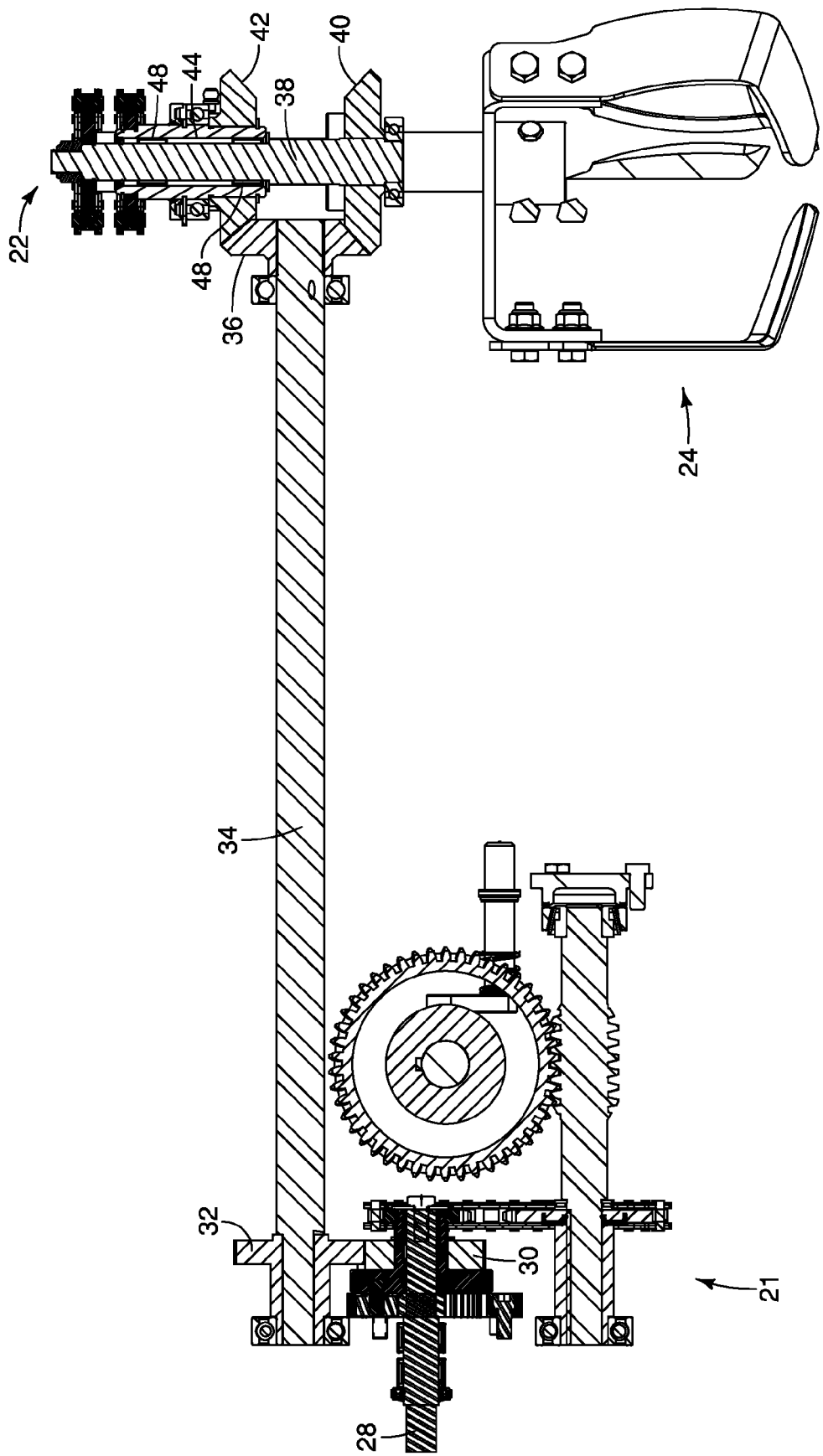
FIG. 4 is a cross-sectional view of the transmission assembly shown in FIG. 3.
Figure 5:
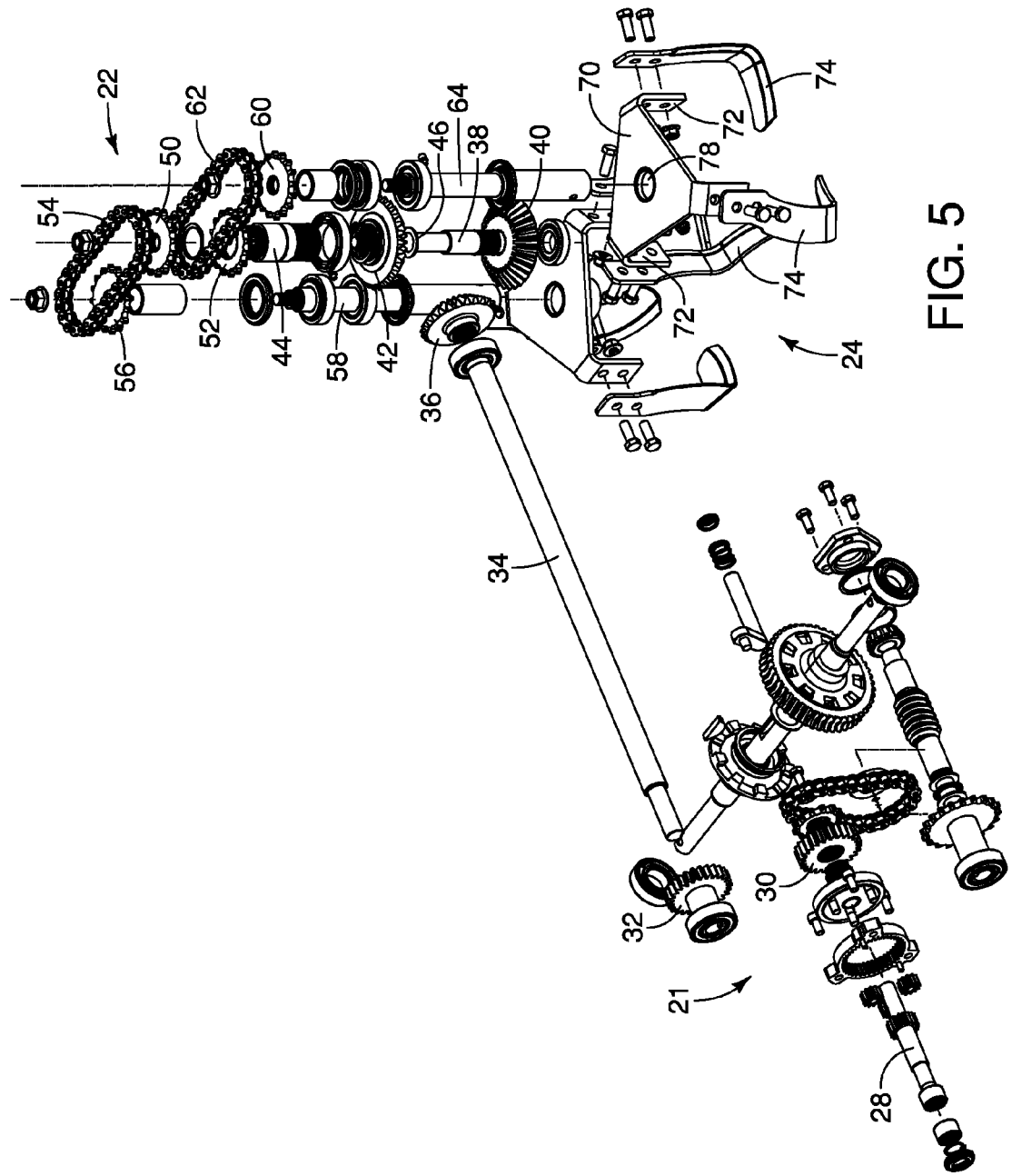
FIG. 5 is an exploded view of the transmission assembly shown in FIG. 3.

As shown in FIGS. 3-5, the transmission of rotational power from the power supply 18 to the power head 22 and from the power head 22 to the tine assemblies 24 is by way of a plurality of shafts and gears of the power transfer assembly 21. The power supply 18 includes an output shaft (not shown) that rotates about a longitudinal axis, and the output shaft is operatively connected to the power transfer assembly 21. The power transfer assembly 21 includes a first drive shaft 28 that extends substantially collinear with the output shaft of the power supply 18, and the first drive shaft 28 is rotatable about the longitudinal axis thereof when driven by the power supply 18 output shaft. A first drive gear 30 is operatively connected to the first drive shaft 28. In an embodiment, the first drive gear 30 is a substantially circular gear having a plurality of teeth extending radially outward. The first drive gear 30 is a spur gear. The first drive gear 30 is positioned about the outer surface of the first drive shaft 28 such that the radius of the first drive gear 30 is substantially larger than the radius of the first drive gear 30. Rotation of the first drive shaft 28 causes the first drive gear 30 to rotate in a like manner in the same rotational direction and about the same longitudinal axis as the first drive shaft 28.

The power transfer assembly 21 also includes a second drive gear 32 that is meshingly engaged with the first drive gear 30, as shown in FIGS. 3-5. In an embodiment, the second drive gear 32 is a substantially circular spur gear having teeth extending radially outward and perpendicular to the face of the gear, wherein the teeth of the second drive gear 32 are configured to mesh with the corresponding teeth of the first drive gear 30 to transfer rotational power from the first drive gear 30 to the second drive gear 32. In an embodiment, the size and number of teeth of both the first and second drive gears 30, 32 are the same such that each of the first and second drive gears 30, 32 rotate about parallel axes in a 1:1 ratio. However, it should be understood by one of ordinary skill in the art that the second drive gear 32 may be larger or smaller and include more or fewer meshable teeth such that the power transfer from the first drive gear 30 to the second drive gear 32 is between 50:1 to 1:50.

In an embodiment, the power transfer assembly 21 includes a second drive shaft 34 operatively connected to the second drive gear 32, as shown in FIGS. 3-5. The second drive shaft 34 is an elongated member that is positioned within the tube 20, wherein the second drive shaft 34 is configured to transfer rotational power from the power transfer assembly 21 to the power head 22. The second drive shaft 34 is rotatable about the longitudinal axis thereof. The second drive gear 32 is attached to the outer surface of the second drive shaft 34 such that rotation of the second drive gear 32 is transferred directly to the second drive shaft 34. As such, the power transfer assembly 21 transfers rotational power from the power supply 18 through the first drive shaft 28, in which rotation of the first drive shaft 28 causes similar rotation of the first and second drive gears 30, 32, which in turn cause the second drive shaft 34 to rotate about an offset and substantially parallel axis relative to the first drive shaft 28. The second drive gear 32 is attached to the second drive shaft 34 adjacent to one distal end of the second drive shaft 34, and a third drive gear 36 is operatively connected to the second drive shaft 34 adjacent the opposing distal end thereof. In an embodiment, the third drive gear 36 is a bevel gear having teeth extending from an angled face of the gear. The bevel gear allows power to be transferred at an angle, and the third drive gear 36 is configured to transfer rotational power from the second drive shaft 34 at a right angle. Accordingly, the power transfer assembly 21 is configured to transfer rotational power generated by the power supply 18 along substantially parallel axis of the first and second drive shafts 28, 34 to the third drive gear 36 which is configured to transfer the rotational power at an angle to both a first transfer gear 40 and a second transfer gear 42 of the power head 22.

In an embodiment, the power head 22 includes a first drive rod 38 oriented substantially perpendicular to the second drive shaft 34, as shown in FIGS. 3-6. The first drive rod 38 is an elongated member oriented in a substantially vertical manner. A first transfer gear 40 is operatively connected to the first drive rod 38, and the first transfer gear 40 is in meshing engagement with the third drive gear 36 of the transfer assembly 21. In the illustrated embodiment the first transfer gear 40 is formed as a bevel gear that is meshingly engaged with a corresponding bevel gear to transfer rotational power at a right angle. The first transfer gear 40 is attached to the first drive rod 38 such that rotation of the first transfer gear 40 caused by meshing engagement with the third drive gear 36 causes the first drive rod 38 to rotate about the longitudinal axis thereof. The first transfer gear 40 is positioned adjacent to one distal end of the first drive rod 38, and the second transfer gear 42 is positioned adjacent to the opposing distal end of the first drive rod 38.

The power head 22 also includes the second transfer gear 42 that is meshingly engaged with the third drive gear 36 of the transfer assembly 21 for transferring rotational power from the third drive gear 36 to the second transfer gear 42, as shown in FIGS. 3-6. In an embodiment, the second transfer gear 42 is formed as a bevel gear which allows the rotational power from the second drive shaft 34 to be transferred at a right angle by way of the meshing engagement between the third drive gear 36 and the second transfer gear 42. The teeth of the second transfer gear 42 are directed toward the teeth of the first transfer gear 42 and the first and second transfer gears 40, 42 are configured to rotate in opposite directions about a collinear axis in response to rotation of the third drive gear 36. The second transfer gear 42 is attached to a sheath 44 that is positioned about the outer surface of the first drive rod 38 adjacent the upper distal end. In an embodiment, the inner radial surface of the second transfer gear 42 includes splines that mesh with corresponding splines formed on the outer surface of the sheath 44 to ensure a substantially rigid connection between the second transfer gear 42 and the sheath 44. A shoulder 46 is formed on the outer surface of the first drive rod 38, and the shoulder 36 is configured to contact the lower distal end of the sheath 44 so as to positively position the sheath 44 relative to the first drive rod 38 and prevent the sheath 44 from sliding axially along the first drive rod 38 toward the first transfer gear 40. At least one needle bearing 48 is attached to the inner radial surface of the sheath 44. The exemplary embodiment is illustrated as having two needle bearings 48 attached to the sheath 44 and contacting the outer surface of the first drive rod 38, thereby allowing the sheath 44 to rotate about the first drive rod 38. Because the sheath 44 and the first drive rod 38 are separated by the needle bearings 48, the sheath 44 and first drive rod 38 can rotate independently and in opposing directions about a common axis.

The power head 22 further includes a third transfer gear 50 operatively connected to the opposite distal end of the first drive rod 38 relative to the first transfer gear 40, as shown in FIGS. 3-6. In an embodiment, the third transfer gear 50 is a sprocket gear having teeth directed radially outward in a relative to the longitudinal axis of the first drive rod 38. The third transfer gear 50 is rigidly attached to the first drive rod 38 such that rotation of the first drive rod 38 rotates the third transfer gear 50 in the same rotational direction.

The power head 22 also includes a fourth transfer gear 52 operatively connected to the sheath 44 adjacent the end opposite the second transfer gear 42, as shown in FIGS. 3-6. In an embodiment, the fourth transfer gear 52 is formed as a sprocket gear having teeth directed radially outward in a relative to the longitudinal axis of the sheath 44. The fourth transfer gear 52 includes a plurality of splines formed on the inwardly-directed radial surface that is configured to meshingly engage with similar splines formed on the outer circumferential surface of the sheath 44. The fourth transfer gear 52 is rigidly attached to the sheath 44 such that rotation of the sheath 44 rotates the fourth transfer gear 52 in the same rotational direction. The first and second transfer gears 40, 42 are configured to directly transfer rotational power to the third and fourth transfer gears 50, 52, respectively, such that the third and fourth transfer gears 50, 52 rotate in opposite directions.

The third and fourth transfer gears 50, 52 are rotatable about the same substantially vertical axis. Both transfer gears are configured to transfer rotational power from the power head 22 to separate tine assemblies 24, as illustrated in FIGS. 3-6. The third transfer gear 50 is positioned vertically above the fourth transfer gear 52, and rotational power is transferred from the third transfer gear 50 to a first power gear 54 by way of a first chain 56 within the power head 22. In an embodiment, the first power gear 54 is formed as a sprocket gear having substantially the same size and teeth as the third transfer gear 50. In another embodiment, the first power gear 54 is formed as a sprocket gear having a different size and a different number of gear teeth as the third transfer gear 50. The first chain 56 is an endless chain that encircles both the third transfer gear 50 and the first power gear 54, wherein the first chain 56 is configured to engage and receive the teeth of both the third transfer gear 50 and the first power gear 54. The first power gear 54 is operatively connected to a first power rod 58 that is vertically aligned and oriented substantially parallel to the first drive rod 38. In an embodiment, the first power gear 54 is fixedly attached to the first power rod 58 by welding or other attachment means to ensure rotation of the first power rod 58 in response to rotation of the first power gear 54. In another embodiment, the first power gear 54 is removably attached to the first power rod 58 by way of meshing spline engagement or other releasable attachment means. The end of the first power rod 58 opposite the first power gear 54 is operatively connected to a tine assembly 24 for transferring rotational power from the power head 22 to the tine assembly 24.

Rotational power is transferred from the fourth transfer gear 52 to a second power gear 60 by way of a second chain 62 within the power head 22. In an embodiment, the second power gear 60 is formed as a sprocket gear having substantially the same size and teeth as the fourth transfer gear 52. In another embodiment, the second power gear 60 is formed as a sprocket gear having a different size and a different number of gear teeth as the fourth transfer gear 52. The second chain 62 is an endless chain that encircles both the fourth transfer gear 52 and the second power gear 60, wherein the second chain 62 is configured to engage and receive the teeth of both the fourth transfer gear 52 and the second power gear 60. The second power gear 60 is operatively connected to a second power rod 64 that is vertically aligned and oriented substantially parallel to the first drive rod 38. In an embodiment, the second power gear 60 is fixedly attached to the second power rod 64 by welding or other attachment means to ensure rotation of the second power rod 64 in response to rotation of the second power gear 60. In another embodiment, the second power gear 60 is removably attached to the second power rod 64 by way of meshing spline engagement or other releasable attachment means. The end of the second power rod 64 opposite the second power gear 60 is operatively connected to a tine assembly 24 for transferring rotational power from the power head 22 to the tine assembly 24. In the exemplary illustrated embodiment, the first and second power gears 54, 60 have the same size and gear teeth such that both gears are configured to rotate about substantially parallel axes at substantially the same rotational speed, thereby driving each of the tine assemblies 24 at the same rotational velocity.

In an embodiment, each tine assembly 24 includes a plate 70 having a plurality of arms 72 extending therefrom, a collar 74 operatively connected to the plate 70 for receiving rotational power from the first or second power rods 58, 64, and a plurality of tines 26, wherein each tine 26 is operatively connected to an arm 72, as shown in FIGS. 3-6. The plate 70 is a substantially flat member having an aperture 78 formed through the thickness thereof. When assembled, the plate 70 is horizontally oriented and is rotatable about a substantially vertical axis. In the exemplary embodiment, the plate 70 has a general triangular shape to which three tines 26 are attached thereto. It should be understood by one of ordinary skill in the art that the plate 70 can be any shape sufficient and any number of tines 26 can be attached thereto. The aperture 78 is centrally located near the center of the plate 70, and one of the power rods 58, 64 extends through the aperture 78.

The arms 72 of the plate 70 extend from the central portion at an angle, as shown in FIGS. 3-6. The arms 72 are integrally formed with the plate 70 but can be attached by way of a weld or other fixedly connecting manner. The arms 72 extend in a substantially perpendicular manner relative to the central portion of the plate 70, wherein the arms 72 have a slight curvature or bend to allow the arms 72 to extend in a vertically downward manner. Each arm 72 includes at least two holes formed therethrough for receiving an attachment mechanism such as a bolt or the like for attaching a tine 26 thereto.

The collar 74 is an elongated, hollow, substantially cylindrical member having a bore formed therethrough, as shown in FIGS. 3-6. The diameter of the bore is substantially the same as the diameter of the aperture 78 formed in the plate 70 such that the bore and the aperture 78 are aligned. The collar 74 is fixedly attached to a lower surface of the plate 70 and is configured to be attachable to an end of the first or second power rods 58, 64 disposed within the bore. In an embodiment, the collar 74 is attached to a power rod 58, 64 by way of a bolt extending through the diameter of both members. It should be understood by one of ordinary skill in the art that any attachment mechanism can be used to rigidly and removably attach the collar 74 of the tine assembly 24 to a power rod 58, 64 of the power head 22 for receiving rotational power therefrom.

Figure 7:
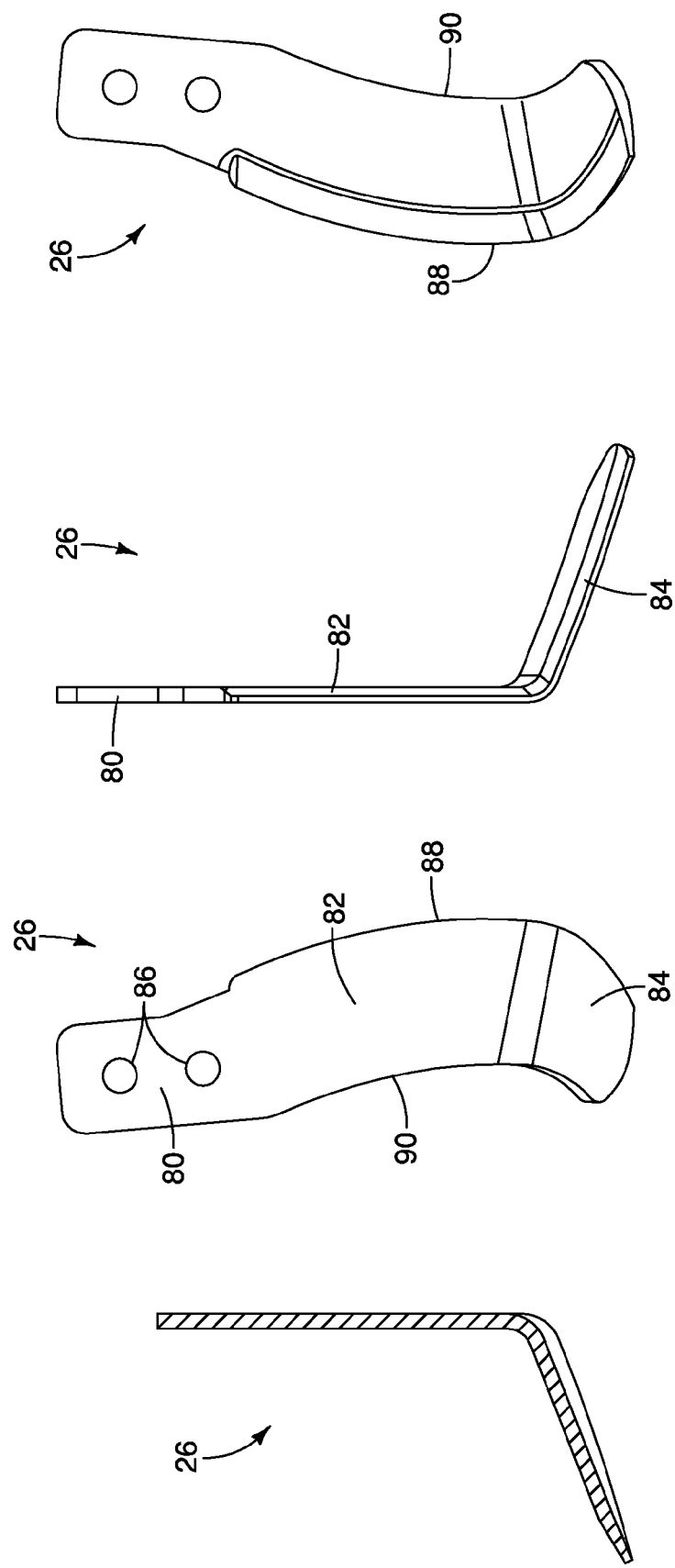
FIG. 7 a front view, rear view, and side view of an embodiment of a tine.

A plurality of tines 26 are removably attached to the arms 72 of the plate 70, as shown in FIGS. 3-6. In the illustrated exemplary embodiment, the tine assembly 24 includes three tines 26 extending vertically downward from the plate 70. It should be understood by one of ordinary skill in the art that any number of tines 26 can be operatively connected to the plate 70. Each tine 26 is an elongated member having a substantially straight portion and a curved or angled tip, as shown in FIG. 7. The tine 26 includes a mounting portion 80, a grinding portion 82, and an angled portion 84. The mounting portion 80 includes a plurality of apertures 86 formed therethrough. The apertures 86 are configured to receive a bolt or other attaching mechanism for removably attaching the tine 26 to an arm 72 of the plate 70. The mounting portion 80 is substantially flat, thereby allowing the mounting portion of the tine 26 to abut the arm 72 to allow increase the surface area through which stresses can be transferred from the tine 26 to the arm 72 during rotation of the tine assembly 24.

In an embodiment, the grinding portion 82 is integrally formed with the mounting portion 80 and extends therefrom, as shown in FIG. 7. The grinding portion 82 is an elongated section that is configured to contact compacted soil as well as loosened soil, wherein rotation of the tine assembly 24 allows the grinding portion 82 to till the soil by loosening compacted soil as well as break up chunks and clods of soil into smaller chunks or particles. In the illustrated exemplary embodiment, the grinding portion 82 is substantially flat and coplanar with the mounting portion 80. In another embodiment, the grinding portion 82 is bowed, or slightly curved outwardly from the mounting portion 80.

The angled portion 84 extends from the end of the grinding portion 82 opposite the mounting portion 80 and integrally formed with the grinding portion 82, as shown in FIG. 7. The angled portion 84 is curved or extends from the grinding portion 82 at an angle. In an embodiment, the angled portion 84 is oriented at an angle of between about 90° and 180° relative to the grinding portion 82. In the exemplary embodiment shown in FIG. 7, the angled portion 84 is oriented at 110° relative to the grinding portion 82. The grinding and angled portions 84 include a leading edge 88 and an opposing trailing edge 90. The leading edge 88 is sharpened or having an otherwise angled edge to provide a sharpened leading edge to the tine 26. The sharpened leading edge 88 allows the tine 26 to cut through compacted soil easier as well as grind smaller clods of dirt.

In operation, the power supply 18 outputs rotational power to the transfer assembly 21 through a series of gears. The transfer assembly 21 the transfers the rotational power in a substantially horizontal manner by way of a drive shaft to the power head 22 which is configured to receive the rotational power and distribute the rotational power to each of the tine assemblies 26 operatively and rotatably connected thereto. The power head 22 is also configured to transfer the horizontal rotational power into vertical rotational power such that the tine assemblies rotate about substantially vertical and parallel axes.

The tine assemblies 24 are configured to rotate about a substantially vertical axis such that the tines 26 are directed downwardly into the ground. In the illustrated embodiment of the vertical tine tiller 10, the tiller includes two tine assemblies 24 that are positioned adjacent to each other and the grinding path along which the tines 26 of each respective tine assembly 24 partially overlap. Because the tine assemblies 24 overlap and are configured to rotate in opposite directions, the tines 26 rotate in an overlapping "egg beater" or "mixing" manner, wherein the sharpened leading edge 88 of tines 26 located forwardmost cut into the hardened or compacted soil then rotate toward the opposing tine assembly 24 in which the tines 26 of each tine assembly 24 then grind up the soil into smaller pieces or clods. This overlapping movement of the tines 26 as well as the rotation of the tine assemblies 24 about vertical axes to cut into the hardened ground reduces the vibrations caused by conventional tillers which is a result of the tines rotating about a horizontal axis wherein the contact between the rotating tines and the compacted dirt causes the tiller to jerk or lurch forwardly. Reduced vibrations and jerking movement of the vertical tine tiller 10 also reduces the amount of physical exertion by the operator. Additionally, because the tines 26 extend downwardly and rotate about a vertical axis, the tines 26 remain in substantially continuous contact with the ground during use. This continuous contact with the ground reduces the number of impacts of the tines 26 with the ground, which results in less shaking and jerking of the tiller 10.

While preferred embodiments of the present invention have been described, it should be understood that the present invention is not so limited and modifications may be made without departing from the present invention. The scope of the present invention is defined by the appended claims, and all devices, processes, and methods that come within the meaning of the claims, either literally or by equivalence, are intended to be embraced therein.

What is claimed is:

1. A vertical tine tiller comprising:
a power supply for generating rotational power;
a transfer assembly operatively coupled to said power supply and including a drive shaft that is rotatable about a horizontal axis and a drive gear attached to said drive shaft for transferring said rotational power from said power supply;
a power head engaged with said drive shaft of said transfer assembly, said power head including a first transfer gear attached to a first drive rod, a second transfer gear attached to a sheath, and at least two power rods operatively connected to said first drive rod and said sheath, said power rods being rotatable about separate vertical axes for transferring said rotational power from said transfer assembly at an angle thereto, said first and second transfer gears being meshingly engaged with said drive gear; and
a tine assembly operatively connected to each of said power rods, said tine assembly including a plurality of vertically aligned tines being rotatable about said vertical axis of said corresponding power rod.

2. The vertical tine tiller of claim 1, wherein said tine assembly further includes a plate to which said tines are removably attached and a collar coupled to one of said power rods.

3. The vertical tine tiller of claim 1, wherein each of said tines includes a mounting portion, a grinding portion and an angled portion integrally connected to each other, said grinding portion extending from said mounting portion, and said angled portion extending from said grinding portion at an angle thereto.

4. The vertical tine tiller of claim 3, wherein said grinding portion and said angled portion include a sharpened leading edge.

5. The vertical tine tiller of claim 1, wherein rotation of said tines of each tine assembly forms a grinding path, and adjacent tine assemblies have overlapping grinding paths.

6. The vertical tine tiller of claim 1, wherein said power supply is an internal combustion engine.

7. The vertical tine tiller of claim 1, wherein said tines are removably connectable to said corresponding tine assembly.

8. The vertical tine tiller of claim 1, wherein each of said tines includes a mounting portion, a grinding portion and an angled portion integrally connected to each other, said mounting portion being removably attachable to a plate that is connected to one of said power rods, said grinding portion extending from said mounting portion, and said angled portion extending from said grinding portion at an angle thereto.

9. The vertical tine tiller of claim 8, wherein said grinding portion and said angled portion include a sharpened leading edge.

10. The vertical tine tiller of claim 1, wherein said first drive rod and said sheath are coaxially aligned.

11. The vertical tine tiller of claim 10, wherein said sheath is disposed about said first drive rod in a concentric manner.

* * * * *